United States Patent [19]
Klena

[11] 3,991,651
[45] Nov. 16, 1976

[54] MACHINE FOR REMOVING MATERIAL

[75] Inventor: Robert S. Klena, Pittsburgh, Pa.

[73] Assignee: Aluminum Company of America, Pittsburgh, Pa.

[22] Filed: Jan. 15, 1975

[21] Appl. No.: 541,242

[52] U.S. Cl. .................................. 90/13 R; 90/14; 90/15 R
[51] Int. Cl.² .......................................... B23C 1/16
[58] Field of Search ............... 90/13 R, 13 B, 15 R, 90/16; 33/27 K, 326; 51/100 R

[56] References Cited
UNITED STATES PATENTS

| | | | |
|---|---|---|---|
| 1,324,005 | 12/1919 | Bucknam | 33/27 K |
| 2,345,494 | 3/1944 | Onsrud | 90/13 |
| 2,811,085 | 10/1957 | Burke | 90/13 |
| 3,259,021 | 7/1966 | Appleton | 90/13 |
| 3,456,555 | 7/1969 | Dunlap | 51/100 R X |

Primary Examiner—Othell M. Simpson
Assistant Examiner—W. R. Briggs
Attorney, Agent, or Firm—Daniel A. Sullivan, Jr.

[57] ABSTRACT

A machine for removing material from a workpiece, including: track means extending along a line through space, the track means being supported without its weight passing through the workpiece; remover means, including a material removing tool, supported on the track means and capable of traveling along the track means, the remover means being supported without its weight passing through the workpiece; workpiece supporting means for holding a workpiece in fixed position relative to the track means; and a template fixed in position relative to the track means; the remover means including workpiece surface sensing means for adjusting the locus of the material removing tool relative to the line through space as the remover means travels along the track means; the remover means including template sensing means for further adjusting the locus of the material removing tool relative to the line through space as the remover means travels along the track means.

5 Claims, 10 Drawing Figures

MACHINE FOR REMOVING MATERIAL

BACKGROUND OF THE INVENTION

The present invention relates to a machine for removing material and more particularly to a milling machine for cutting curved or spherical plate to size and preparing its edges prior to welding.

An example of where a large amount of plate cutting to size and edge preparation prior to welding must be done is in the fabrication of spherical tanks for the containment of liquidified natural gas (LNG). Thus, in the article entitled "Aluminum and LNG — New Perspective on a Changing Partnership" by George E. Herrman and Donald E. Branscome, PIPELINE & GAS JOURNAL, June 1973, there is shown in FIG. 9 a spherical tank constructed by welding together a plurality of spherically curved, "orange-peel" sections. These orange-peel sections are first cut to size and the edges prepared, this being followed by the welding together of the plates into the final spherical tank.

Background on the edge preparation of plate prior to welding can be obtained, for example, from the article entitled "Joint Design and Edge Preparation", which occurs on page 297 of Volume 6 (Welding and Brazing) of the METALS HANDBOOK, 8th Edition, American Society for Metals, 1971. Thus, in the welding of aluminum plate, it may be advantageous to use the double-V-groove butt joint pictured on page 298 of the referenced Volume 6. The plate edge preparation suitable for making a double-V-groove butt joint can be performed by moving an appropriately formed, milling machine cutting tool by the plate edges. Furthermore, if the milling machine cutting tool is moved on a particular path relative to the curved plate, the plate will be cut to the correct size while simultaneously preparing the edge for welding.

SUMMARY OF THE INVENTION

It is an object of the present invention to provide a new machine for removing material.

A more particular object of the invention is the provision of a milling machine suited for cutting to size and preparing the edges of spherically curved plate prior to welding.

These as well as other objects which will become apparent in the discussion that follows are achieved, according to the present invention, by providing a machine for removing material from a workpiece, including: track means extending along a line through space, the track means being supported without its weight passing through the workpiece; remover means, including a material removing tool, supported on the track means and capable of traveling along the track means, the remover means being supported without its weight passing through the workpiece; workpiece supporting means for holding a workpiece in fixed position relative to the track means; and a template fixed in position relative to the track means; the remover means including workpiece surface sensing means that control first adjustment means for adjusting the locus of the material removing tool relative to the line through space as the remover means travels along the track means; the remover means including template sensing means that control second adjustment means for further adjusting the locus of the material removing tool relative to the line through space as the remover means travels along the track means wherein a plane is defined by the locus of the material removing tool as the remover means is allowed to travel along the track means without permitting adjustments by either of the sensing means; and means to provide that the direction of adjustment of the material removing tool controlled by the template sensing means is perpendicular to said plane and means to provide that the directions of adjustment of the material removing tool controlled by the workpiece sensing means are parallel to said plane.

The material removing tool may be, for example, an oxygen collimating orifice in the case of removing, for instance, mild steel, a plasma arc cutting torch, or the milling cutter hereinafter described.

DETAILED DESCRIPTION OF THE DRAWINGS

Figure 1:
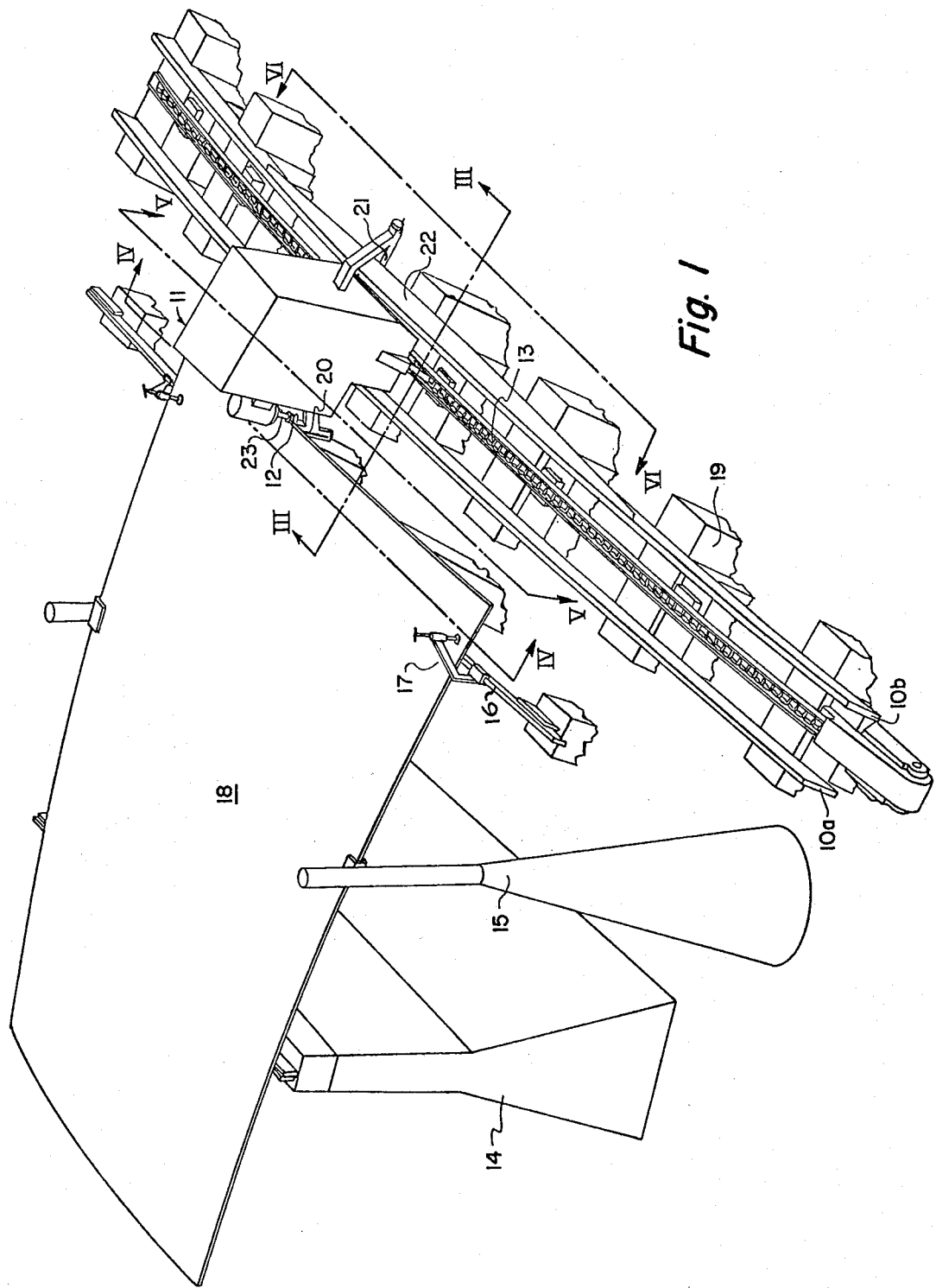
FIG. 1 is a perspective, partially schematic view of an embodiment of the invention.

FIGS. 1 to 9 illustrate one embodiment of the invention. Referring firstly to FIG. 1, there is shown track means in the form of tracks 10a and 10b. These tracks extend along a line through space, which line is in this example a circle. The precise location of this line through space is not important and it may be arbitrarily thought of as lying in the vicinity of the tracks 10a and 10b. Tracks 10a and 10b are parallel to it. The line is a mean, or average, line through space, as will be explained below. Supported on tracks 10a and 10b is a material remover means 11, which includes a material removing tool. In this example, the material removing tool is a milling cutter 12.

Figure 2:
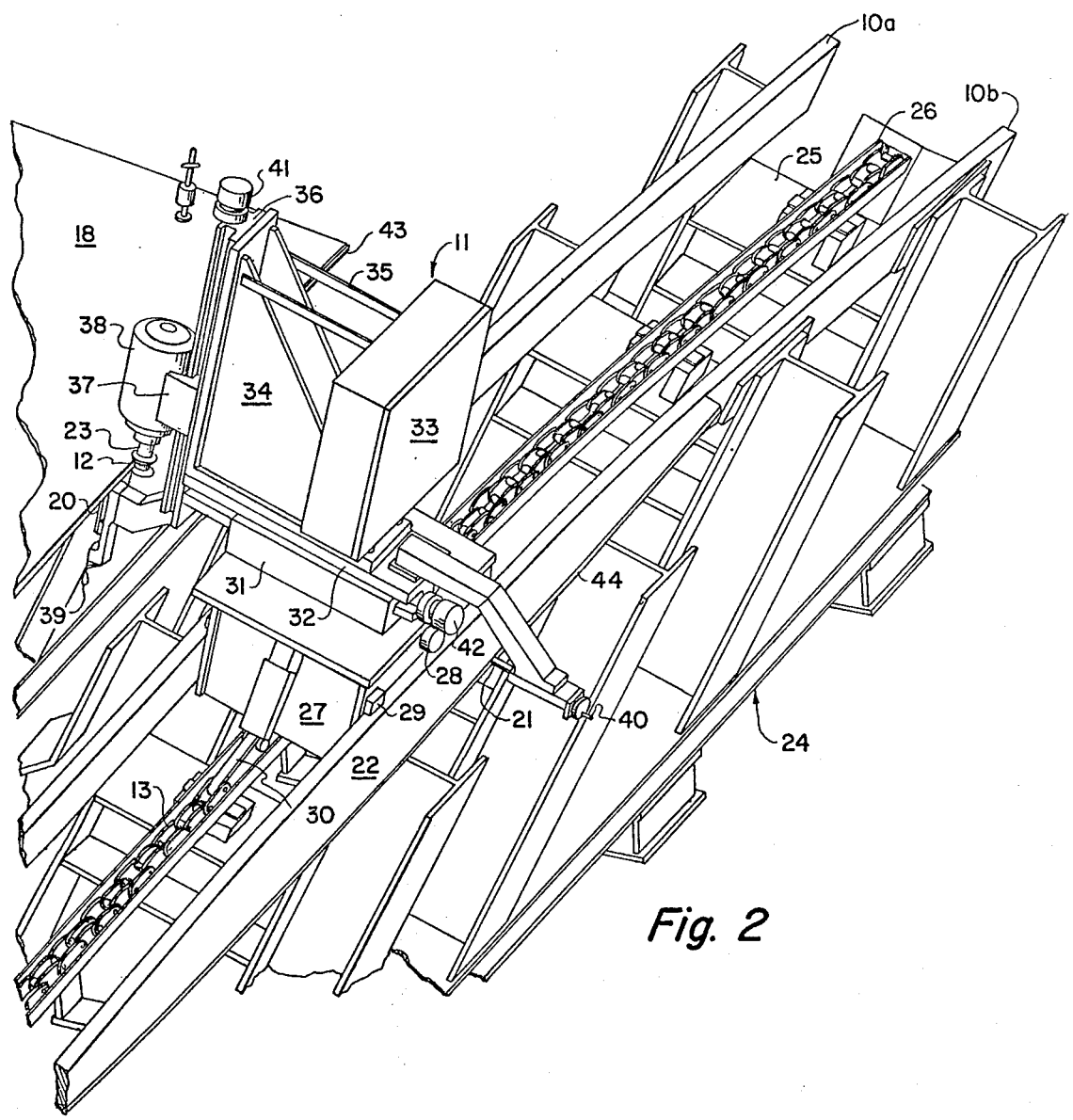
FIG. 2 is a detailed view of a part of FIG. 1.

The illustration of remover means 11 is primarily schematic in FIG. 1, with a detailed exemplary illustration being given in FIG. 2. The remover means can be caused to travel along the tracks 10a and 10b. In this example the remover means is caused to travel by a pulling action exerted by chain 13, this chain being actuated by a variable speed electric motor (not shown) which controls the remover means cutting feed rate and a constant speed electric motor which returns the remover means at a faster rate.

Workpiece supporting and clamping means, for example means 14, 15, 16 and 17, are provided to hold a workpiece, in this example a spherically curved plate 18, in fixed position relative to the tracks 10a and 10b. This is accomplished, as a practical matter, by the fact that the workpiece supporting means are fixed relative to the means, for example post 19, provided to support the tracks 10a and 10b. It is to be noted that neither the weight of the tracks 10a and 10b nor the weight of the remover means 11 passes through the workpiece, in contrast to the practice in the prior art of using the workpiece itself as a means of support.

The remover means 11 includes a workpiece surface sensing means 20 for adjusting the locus of the milling cutter 12 relative to the mean line through space as the remover means 11 travels along the tracks 10a and 10b.

The remover means 11 also includes a template sensing means 21 for sensing a template 22, which is fixed in position relative to the tracks 10a and 10b, for further adjusting the locus of the milling cutter 12 relative to the mean line through space as the remover means 11 travels along the tracks 10a and 10b.

The sensing means 20 and 21 are, for example, linear variable differtial transformers (LVDT's).

In the illustrated embodiment, if one focuses on the material removing tool, e.g. milling cutter 12, and considers it to be a point in space, the locus of that point as remover means 11 travels along tracks 10a and 10b is a circle. Here, in generating this circle, no adjustments caused by the sensing means 20 and 21 are permitted. This generated circle defines a plane, and the directions of adjustment of the milling cutter 12 caused by the workpiece sensing means 20 are parallel to that plane.

Considering next the direction of adjustment of the milling cutter 12 caused by template sensing means 21, that direction is perpendicular to the plane defined by the circle generated by the milling cutter movement. The position of the template sensing means on the template 22 in the instantaneous direction of adjustment caused by the workpiece sensing means is independent of the adjustment caused by the workpiece sensing means.

Likewise in the embodiment shown, the material removing tool, in the form of the illustrated milling cutter 12, is mounted on a spindle 23 included in the remover means, which spindle is always perpendicular to the circle generated by the milling cutter 12 as the remover means travels along the tracks 10a and 10b without any adjustments by the sensing means 20 and 21.

Referring next to the more detailed illustration of the remover means 11 and its environment in FIG. 2, it will be seen that, in the illustrated example, the tracks 10a and 10b are supported by an I-beam structure 24, this structure including cross members 25, on which is mounted a channel 26 for chain 13.

Template 22 is connected in fixed manner to track 10b. It may be advantageous to arrange several templates 22 in tiers, so that one has a choice of templates to be sensed by sensing means 21 without having to go to the trouble of exchanging templates.

The remover means 11 includes, in more detail, a box 27, which has rollers, for example roller 28, that allow the box 27 and what is supported on it to roll, and thus travel, along the tracks 10a and 10b. It is through these rollers that the remover means is supported on the tracks 10a and 10b. Should there be a failure in wheel 28, safety stops 29 are provided to prevent a major falling of the remover means 11.

The pulling force exerted by chain 13 on the remover means is by way of linkage 30 connecting the chain with box 27.

Proceeding upwards in the remover means 11, there is fixedly mounted on box 27 a saddle 31, which forms the way for slide 32.

Slide 32 forms the support for the remainder of the remover means 11, as one progresses to milling cutter 12. Included is a box 33 containing electrical circuitry; gussets 34 and struts 35 are rigidifying members.

While movement of slide 32 relative to saddle 31 provides movement of the cutting tool substantially in a horizontal direction, movement in the vertical direction is provided by the combination of 1) way member 36, which is rigidly connected to slide 32 and gussets 34, and 2) saddle 37, saddle 37 being, in turn, rigidly connected to motor 38.

Shown in more detail in FIG. 2 are the sensing means 20 and 21. These includes means, for instance, handles 39 and 40, to provide for adjustment of the milling cutter 12 relative to the sensing means 20 and 21. As mentioned above, an example of the sensing means are linear variable differential transformers. When these sensing means are out of their zero positions, they cause compensating operation of motors 41 and 42. As is shown, sensing means 20 senses the underside of the plate 18, the edge of which is being machined, while sensing means 21 senses the edge of template 22.

Figure 9:
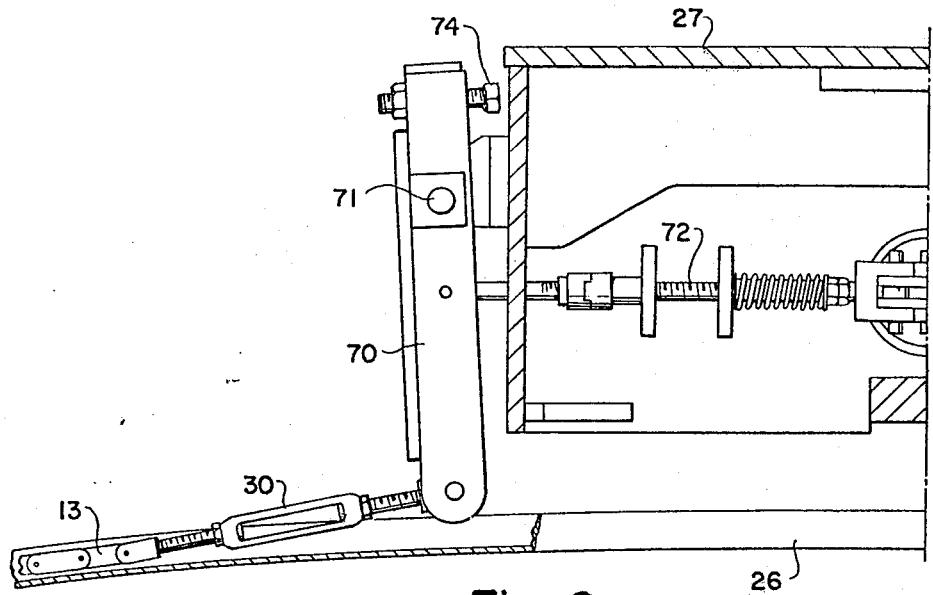

As was mentioned above, the mean line through space followed by tracks 10a and 10b is a circle in this example. With reference to FIG. 9 of the above mentioned article in the PIPELINE & GAS JOURNAL, it will be seen that the vertically directed edges of the "orange-peel" sections may be chosen to lie along great circles of the sphere. In contrast, for the horizontally lying edges, only a horizontal edge lying at the equator would be on a great circle of the sphere. If the edge 43 in FIG. 2 is to be an edge lying along a great circle, then the machining job for cutting to size and edge preparation prior to welding can be made rather simple by making the mean line though space followed by tracks 10a and 10b be a circle of radius equal to the radius of the sphere. The unmachined edge 43 is situated essentially parallel to the line of tracks 10a and 10b, and then the milling cutter 12 is adjusted, using handles 39 and 40, to be situated correctly vertically and for the proper depth of cut, following which the motor 38 is turned on and chain 13 actuated to pull the remover means 11 along tracks 10a and 10b. There results the prepared edge. Depending on the particulars of the machining operation, one or several passes may be made to reach final dimensions.

In this last example, where the radius of the circular mean line through space equaled that of the sphere, and the edge was along a great circle, sensing means 20 and 21 could be turned off (although it may be advantageous to leave them on, sensing means 20 to compensate for small deviations in the plate 18, template 22, having been given a surface precisely lying along a path parallel to the circular mean line through space, to compensate, for instance, for play in the mounting of box 27 on track 10a). If the radius of curvature of plate 18 is other than that of tracks 10a and 10b, for instance, in the case where the manufacturing plant is making spheres of different diameters, the machine of the present invention can, nevertheless, be used to prepare an edge 43 lying along a great circle of the sphere of different diameters. This is accomplished through the use of sensing means 20. As the remover means 11 is pulled along tracks 10a and 10b by chain 13, the linear variable differential transformer in means 20 actuates motor 41 to cause the milling cutter 12 to move along the circle of the particular sphere being made. When spheres of different diameter are being manufactured, it is advantageous to make the radius of the circle of the mean line through space roughly halfway between the radii of the minimum and maximum spheres, and it is for this reason that the path of tracks 10a and 10b has come to be referred to as a "mean" line through space.

The machine of the present invention also enables the edge preparation of an edge lying in a horizontal plane above or below the equator. This is done by making use of sensing means 20, as described previously, and sensing means 21 with surface 44 of template 22 correcting for the fact that the edge to be prepared is no longer along a great circle.

Figure 3:
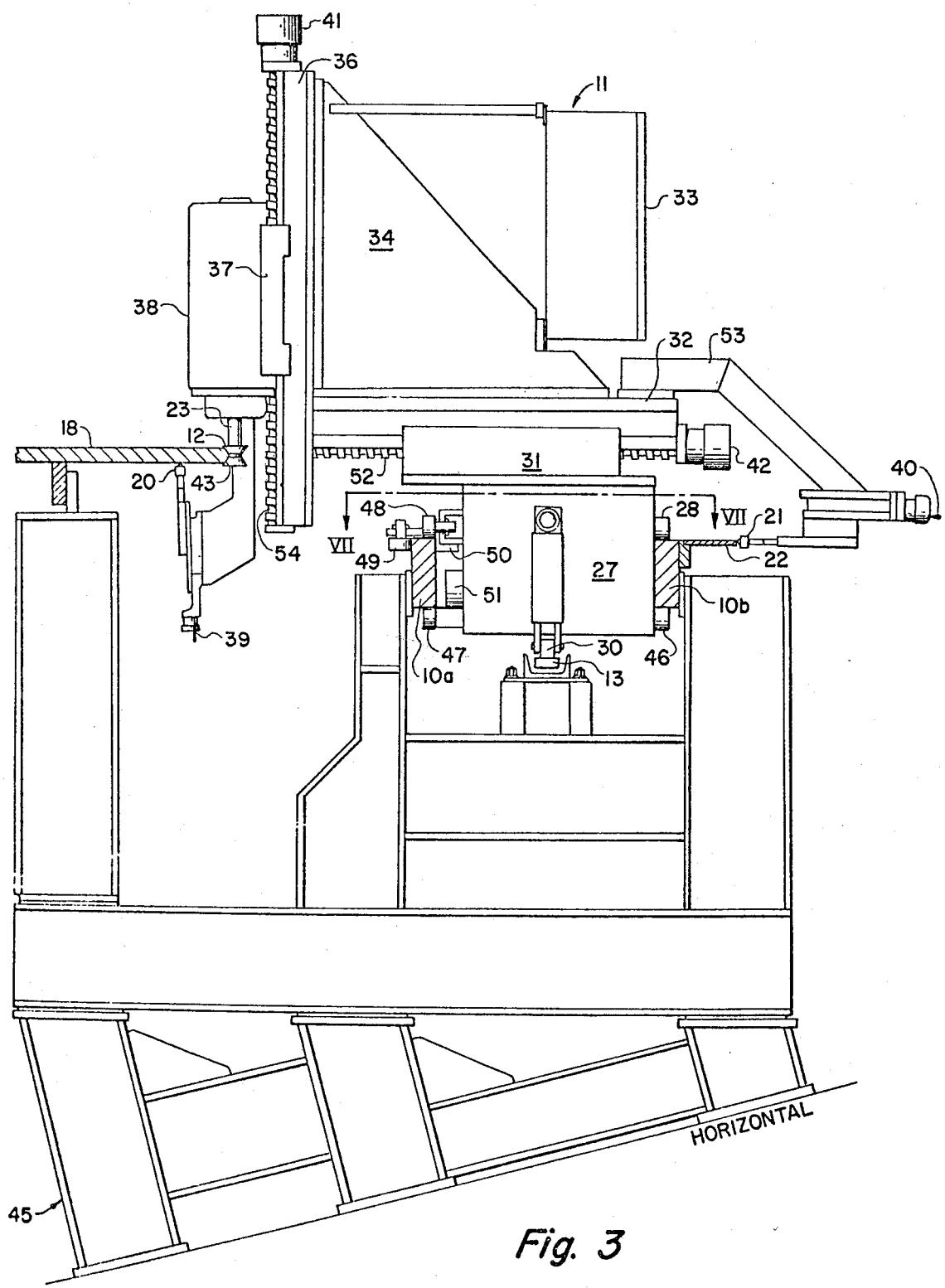
FIGS. 3 to 6 are views in the directions indicated respectively by the lines III—III, IV—IV, V—V, and VI—VI of FIG. 1.

Coming now to FIG. 3, certain aspects of the exemplary machine are illustrated in further detail. Before proceeding with respect to this figure, it should be noted that the actual horizontal plane occurs as indicated by that work in FIG. 3, the particular orientation for the drawing having been chosen simply to assure that it would fit within the space permitted.

Thus, it will be noted from FIG. 3 that remover means 11 is actually tilted somewhat with respect to the horizontal, and this is for the purpose of getting the axis of cutting tool 12 substantially perpendicular to the surface of plate 18 which is also out of the horizontal at its edge 43. For example, if plate 18 is an "orange-peel" section, there will be an opposite edge 43 on the other side of the plate and it may be advantageous to use another machine of the invention to simultaneously machine that edge. By tilting the shown machine from the horizontal, the amount of tilt in the machine for machining the opposite edge 43 need not be as great as it otherwise would have to be if the shown machine were not tilted and the plate 18 were mounted so as to have its surface regions adjoining the shown edge 43 substantially horizontal.

When "orange-peel" sections of different sizes or curvatures are to be machined, the support structure 45 of wedge shape can be exchanged for a similar structure of different angle. It is, of course, not necessary to keep the setup completely symmetrical, so that all of the exchanging of wedge shaped support structures 45 can be done just on one side of the plate, for instance, the side shown in FIG. 3.

Further with reference to FIG. 3, the mounting of box 27 is shown in further detail. Thus, besides wheel 28 there now appear additional wheels 46, 47, and 48 for the up and down securement of remover means 11, while wheels 49 and 50 provide for the sideways alignment of the remover means.

Should a break occur in chain 13, a safety brake system 51 is provided. This system will be described in more detail below.

Also shown in more detail in FIG. 3 is the connection between saddle 31 and slide 32. Thus, there is included a screw 52, driven by motor 42, to create relative movement between them as demanded by sensing means 21 as it moves along template 22. Likewise shown in more detail is the fixed securement of the sensing means 21 relative to slide 32 by means of its housing 53.

The interrelationship of saddle 37 and way 36 also appears in greater detail in FIG. 3. Here too, a screw, screw 54, is provided to create controlled, relative movement between the saddle 37 and the way 36 as a function of electrical control from sensing means 20 to motor 41. The use of the mechanism including screw 54 causes the position of sensing means 21 on template 22 to be independent of the adjustments caused by sensing means 20.

Figure 4:
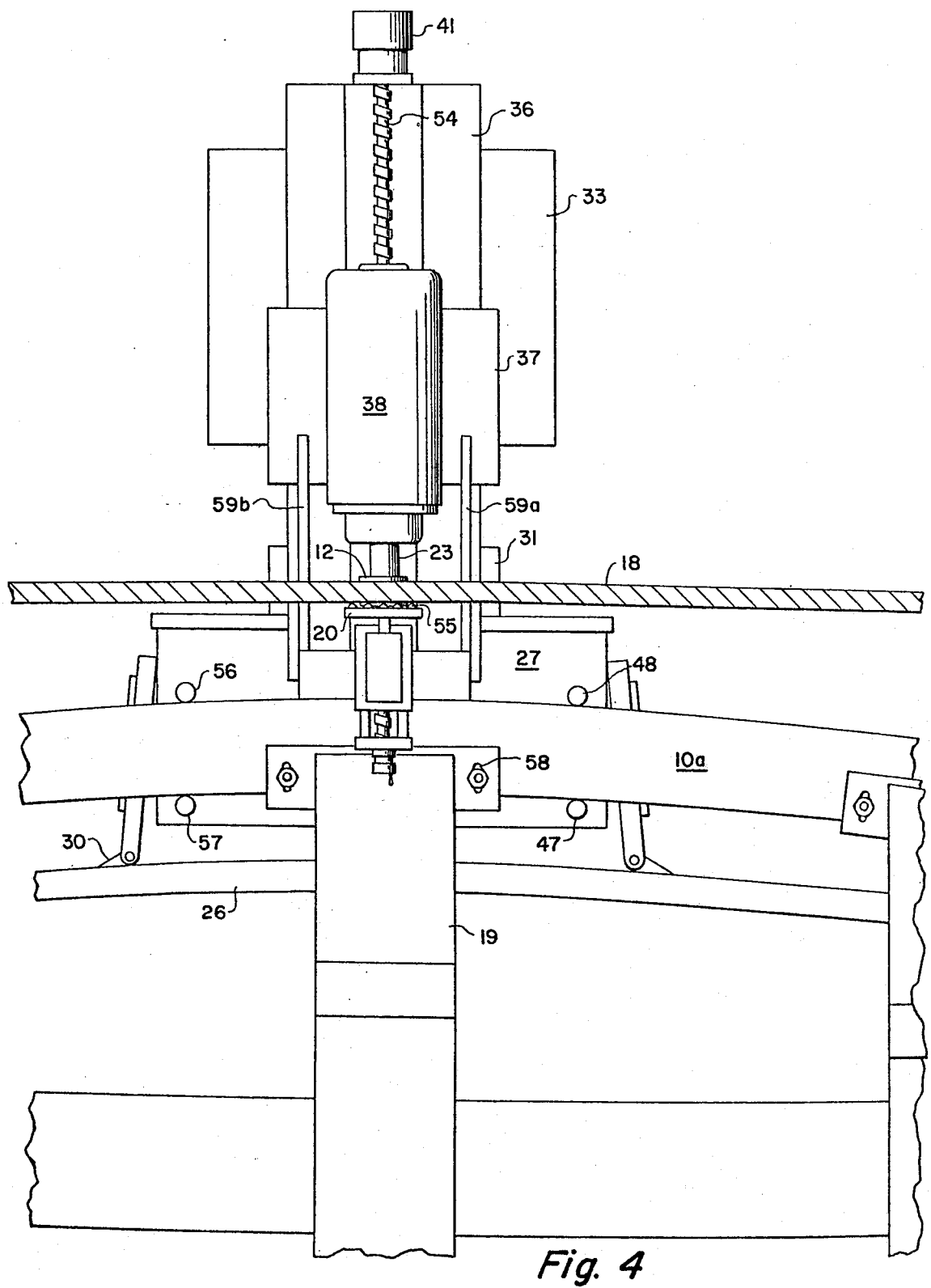

Now proceeding to FIG. 4, that figure contains additional illustration of certain portions of the exemplary machine being used to illustrate the present invention. For example, sensing means 20 is shown to include five rollers 55 mounted on the top of a T-bar; the purpose being to prevent the jumping of sensing means 20 upwards, once the end of the cut along the edge is reached. Thus, a rapid jump of the sensing means 20 upwards could cause motor 41 to jam the milling cutter 12 against the plate 18, particularly if a double-V-groove butt joint were being prepared. Also shown in FIG. 4 with respect to sensing means 20 are arms 59a and 59b illustrating that the sensing means 20 is connected to saddle 37.

Additionally in FIG. 4, it is indicated that, in addition to wheels 47 and 48, there are corresponding wheels 56 and 57 at the other end of box 27.

It is likewise evident that slots 58 are provided to ease the exact positioning of track 10a during the bolting of it to the support means, for example post 19.

FIG. 4 additionally shows in more detail the position of linkage 30 between 1) the chain, in channel 26, and 2) box 27. Further details on this linkage are explained below with reference to FIGS. 7 to 9.

Figure 5:
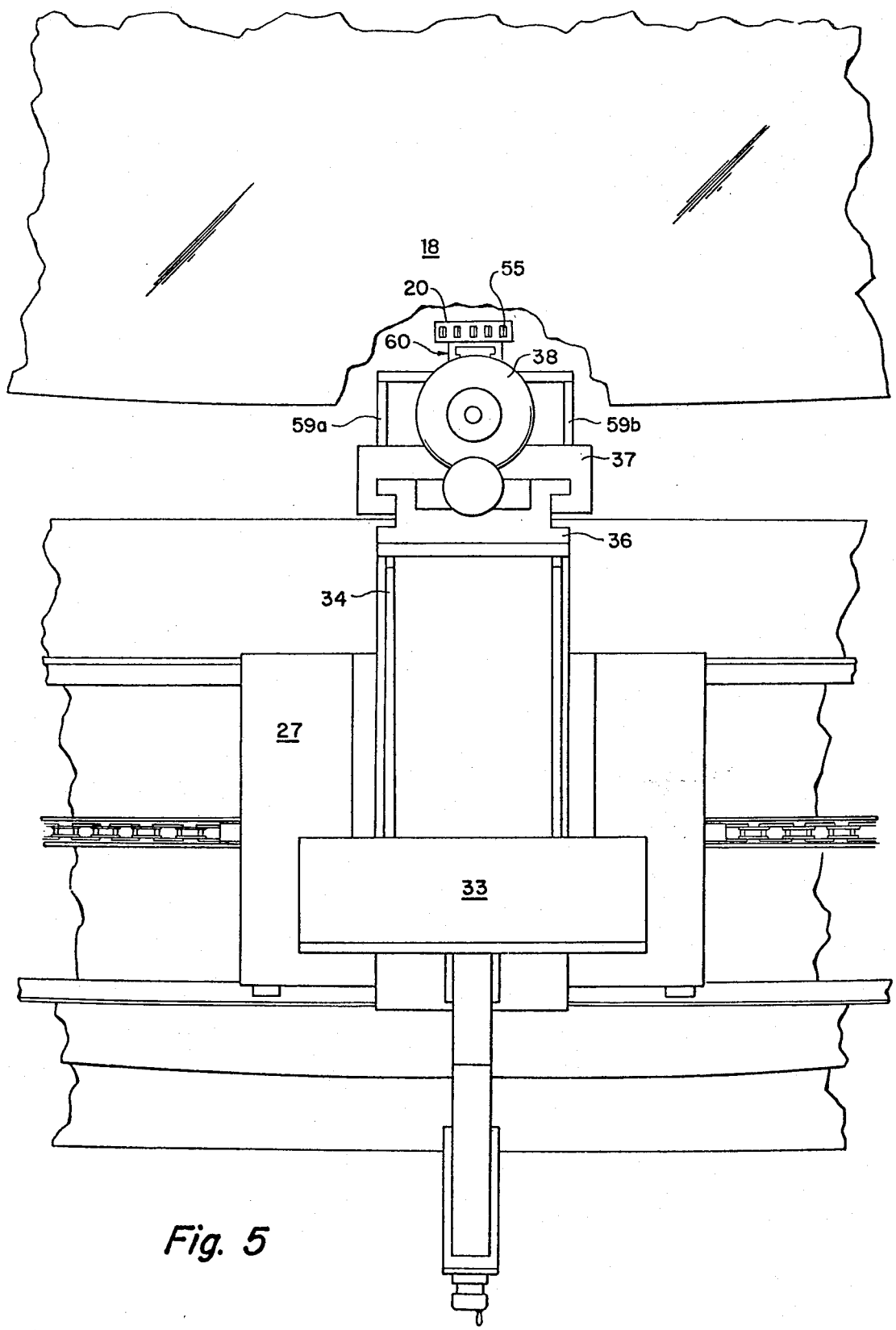

FIG. 5, which is a top view of the machine, shows, for example, that the altering of the milling cutter relative to the sensing means 20 is accomplished by a saddle/slide assembly 60 (see also FIG. 3), relative movement in which is created by a screw (not shown) rotated by handle 39 (shown e.g. in FIG. 3).

Also in FIG. 5, one sees in more detail the relationship of saddle 37 to way 36.

Figure 6:
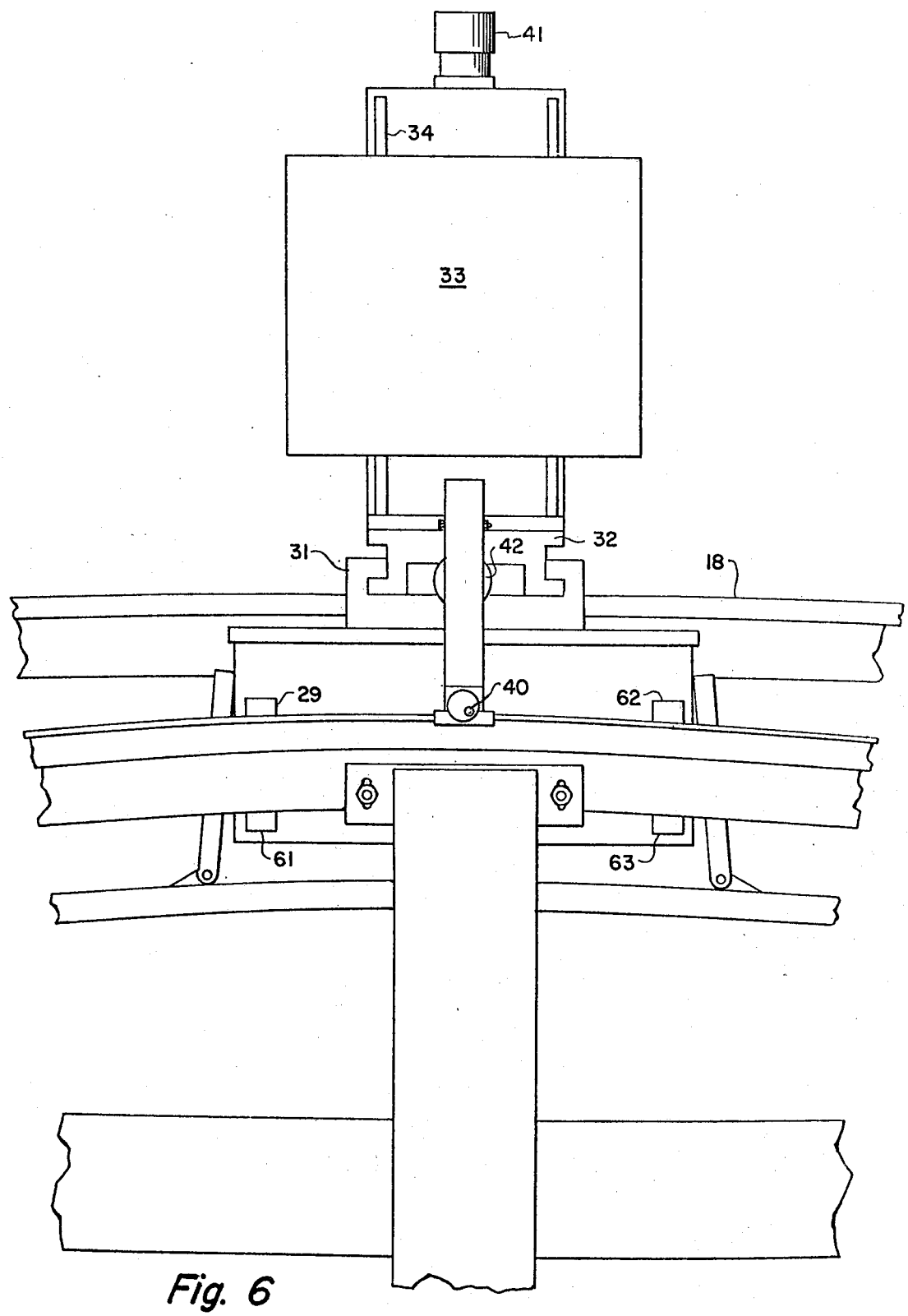

Referring now to FIG. 6, it can be seen that, besides safety stop 29 there are additional saftey stops 61, 62, and 63. In this view, the wheel 28 and that below it, i.e. wheel 46, are hidden.

Additionally best shown in FIG. 6 is the relationship between saddle 31 and slide 32.

Figure 7:
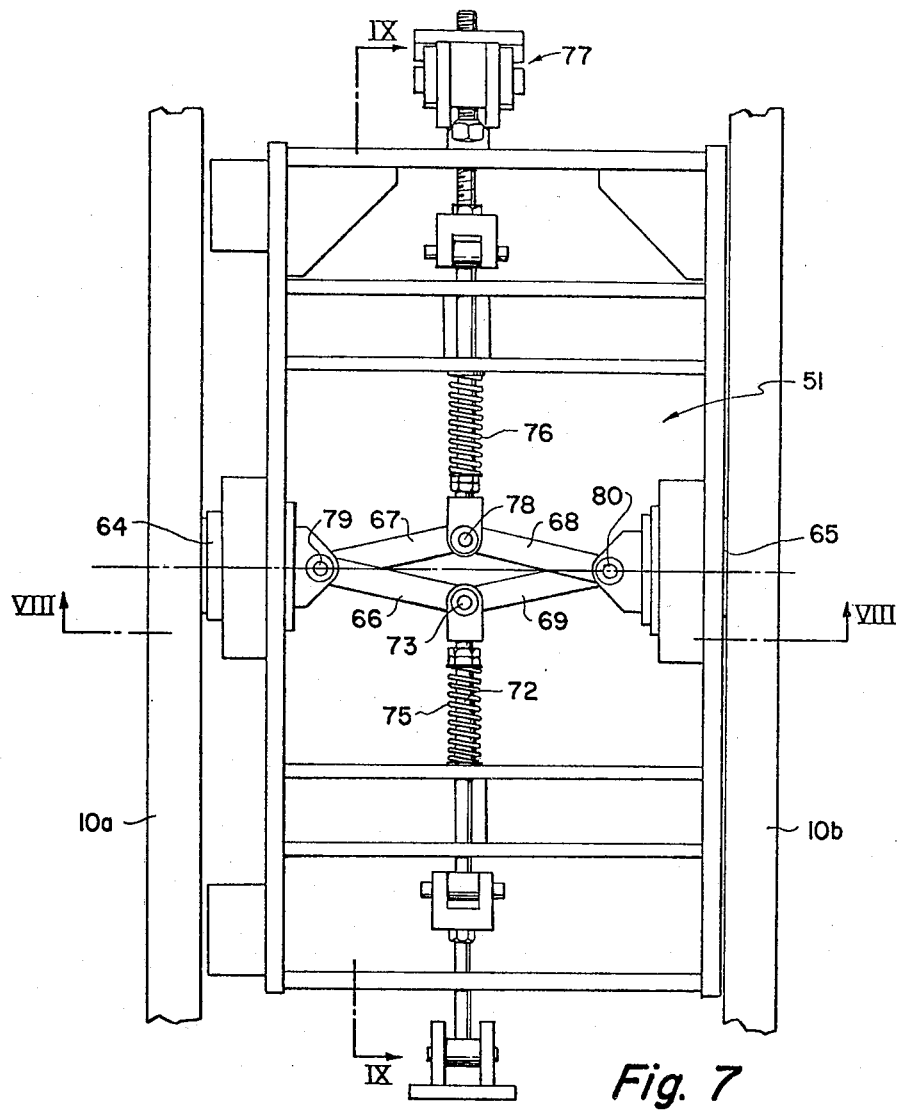
FIG. 7 is a view in the direction indicated by the line VII—VII of FIG. 3.
Figure 8:
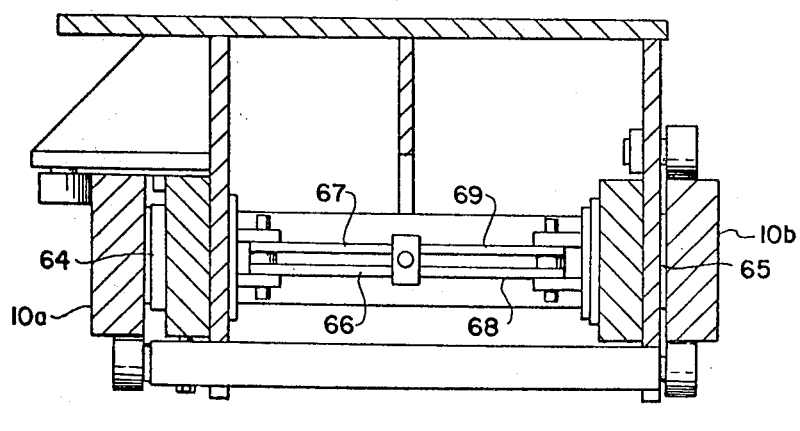
FIGS. 8 and 9 are view in the directions indicated respectively by the lines VIII—VIII and IX—IX of FIG. 7.

FIGS. 7 to 9 are respectively top and side views of the interior of box 27. Essentially there is contained within box 27 the assembly of parts referred to in the discussion of FIG. 3 as the safety brake system 51. Included in this system are shoes 64 and 65 which, by frictional engagement with tracks 10a and 10b, can stop the remover means 11, should there for example be a break in chain 13. Braking system 51 is based on a collapsible/extensible parallelogram linkage of links 66, 67, 68 and 69. With reference particularly to FIG. 9, chain 13 is connected by way of linkage 30 to pivot member 70, whose pivot point on box 27 is at axis 71. The pivot member 70 is connected to the parallelogram linkage by rod means 72 at point 73 (FIG. 7). The amount of swing which can be executed by pivot member 70 is controlled by stop 74.

In the operation of the braking system, the brake shoes are initially tightly engaged with tracks 10a and 10b due to the efforts of springs 75 and 76 to expand. When it is desired to move the remover means 11 along the tracks 10a and 10b, tension is created in chain 13. This tension acts on pivot member 70 and its counterpart 77 on the other side of box 27. Points 73 and 78 are pulled apart from one another and this collapses points 79 and 80 inwards to release the shoes 64 and 65 from their frictional engagement of the tracks 10a and 10b. The remover means 11 is then free to move along, for instance to allow milling cutter 12 to cut a plate to size and simultaneously perform an edge preparation in preparation for welding. Should the chain break, springs 75 and 76 act immediately to force shoes 64 and 65 into frictional engagement with tracks 10a and 10b to stop the remover means 11.

While emphasis has been placed in the above disclosure on a preferred embodiment wherein tracks 10a and 10b lie on a circular path, it will be clear that the present invention can be used to machine along a wide range of paths. For example, edge 43 may lie along a line formed by the intersection of a plane with a paraboloid and tracks 10a and 10b may be given a corresponding parabolic curvature, although such would not be necessary, since the tracks could be left with a circular curvature and sensing means 20 could compensate.

There is of course the additional possibility of following even more complicated paths by utilizing appropriately formed templates 22.

A suitable sensing means 20 is the linear variable differential transformer model No. PCA 112-100 combined with signal conditioner No. CAS–025, both of which are supplied by the Schaevitz Engineering Company of Pennsauken, N.J. Also sensing means 21 may be formed from this combination. Motors 40 and 41 and appropriate electrical circuitry to work with such a linear variable differential transformer are readily available, for instance from Control Systems Research of Pittsburgh, Pa.

Figure 10:
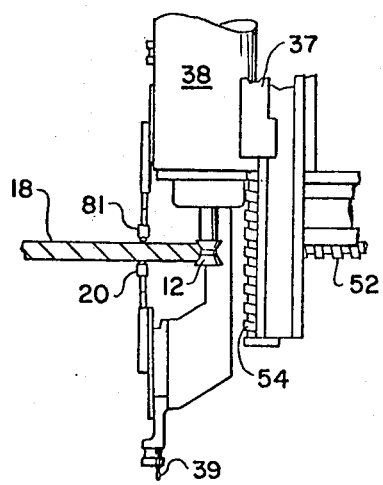
FIG. 10 is a view as in a part of FIG. 3 of a modified embodiment of the invention.

FIG. 10 illustrates a supplemented version of the machine of FIGS. 1 to 9. The machine of FIG. 10 can be used, for example, for the cutting to size and simultaneous edge preparation of a plate whose thickness becomes greater, or smaller, as one moves along the edge in traveling along tracks 10a and 10b. An example of such a plate is tapered plate which may be produced by varying the spacing between the rolls in a rolling mill, as the plate passes through the rolling mill. The machine of FIG. 10 allows machining for a double-V-groove butt joint with the central land between the two beveled portions being, for example, exactly half way up the edge. This is accomplished by providing an additional sensing means 81 of the same type as sensing means 20. Their voltage outputs are caused to add to zero, so that motor 41 sees no signal, and thus allows cutting tool 12 to remain in the same position up and down with respect to the edge thickness. The voltage outputs of sensing means 20 and 81 may additionally be proportioned so that, for example, the land is always one-third of the way up the edge.

It will be understood that the above description of the present invention is susceptible to various modifications, changes, and adaptations and the same are intended to be comprehended within the meaning and range of equivalents of the appended claims.

What is claimed is:

1. A machine for removing material from a workpiece, comprising: track means extending along a curved line through space, said track means being supported without its weight passing through the workpiece; remover means, including a material removing tool, supported on the track means and capable of traveling along the track means, said remover means being supported without its weight passing through the workpiece; workpiece supporting means for holding a workpiece in fixed position relative to the track means; and a template fixed in position relative to the track means; the remover means including workpiece surface sensing means that control first adjustment means for adjusting the locus of the material removing tool relative to said line through space as the remover means travels along the track means; the remover means including template sensing means that control second adjustment means for further adjusting the locus of the material removing tool relative to said line through space as the remover means travels along the track means; wherein a plane is defined by the locus of the material removing tool as the remover means is allowed to travel along the track means without permitting adjustments by either of the sensing means; and means to provide that the direction of adjustment of the material removing tool controlled by the template sensing means is perpendicular to said plane and means to provide that the directions of adjustment of the material removing tool controlled by the workpiece surface sensing means are parallel to said plane.

2. A machine as claimed in claim 1, wherein said line through space is a circle.

3. A machine as claimed in claim 2, wherein the material removing tool is mounted on a spindle included in the remover means and wherein the locus of the material removing tool as the remover means is allowed to travel along the track means without permitting adjustments by either of the sensing means is a circle, and means to provide that the spindle is always pendicular to said circle as the remover means travels along the track means.

4. A machine as claimed in claim 1, wherein the remover means further includes an additional workpiece surface sensing means for cooperating with the first workpiece surface sensing means in adjusting the locus of the material removing tool relative to said line through space as the remover means travels along the track means.

5. A machine as claimed in claim 1, wherein the position of the template sensing means on the template in the instantaneous direction of adjustment caused by the workpiece sensing means is independent on the adjustment caused by the workpiece sensing means.

* * * * *